United States Patent
Boudnik et al.

(10) Patent No.: US 7,167,894 B1
(45) Date of Patent: *Jan. 23, 2007

(54) SELF-CONTAINED TASKS

(75) Inventors: Konstantin I. Boudnik, Castro Valley, CA (US); Weiqiang Zhang, San Jose, CA (US); Alexei Volkov, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 816 days.

This patent is subject to a terminal disclaimer.

(21) Appl. No.: 10/224,685

(22) Filed: Aug. 20, 2002

(51) Int. Cl.
*G06F 15/16* (2006.01)
*G06F 15/177* (2006.01)
*G06F 15/173* (2006.01)
*G06F 9/44* (2006.01)

(52) U.S. Cl. .................. 709/201; 709/220; 709/226

(58) Field of Classification Search .................. 709/201
See application file for complete search history.

(56) References Cited

U.S. PATENT DOCUMENTS 6,182,106 B1*   1/2001   Casey et al. ................ 718/100
6,922,832 B2*   7/2005   Barnett et al. ................ 718/1
6,952,714 B2*  10/2005   Peart ........................... 709/203
2003/0126200 A1*  7/2003   Wolff .......................... 709/226
2003/0172135 A1*  9/2003   Bobick et al. ............... 709/201
2004/0003029 A1*  1/2004   Islam et al. .................. 709/203

OTHER PUBLICATIONS

Venables, Wayne "Nouveau Networking: Introducing Jini", Mar. 1999, Hello World!, Issue 1, vol. 1, pp. 1-3.*

* cited by examiner

*Primary Examiner*—Patrice Winder
*Assistant Examiner*—Hassan Phillips
(74) *Attorney, Agent, or Firm*—Martine Penilla & Gencarella, LLP

(57) ABSTRACT

A distributed processing system includes a first computer, and a second computer that is coupled to the first computer by a computer network. The first computer also includes a first Java virtual machine and a Java control system. The second computer includes a second Java virtual machine and a Java control system client. The second computer is configured to execute a task object. The task object includes several sub-tasks including one or more common sub-tasks. The task object also includes a quantity of input data for processing by the task object and a scheduling class that schedules execution of each of the sub-tasks.

16 Claims, 7 Drawing Sheets

SELF-CONTAINED TASKS

CROSS REFERENCE TO RELATED APPLICATIONS

This application is related to (1) U.S. patent application Ser. No. 10/225,535, filed Aug. 15, 2002 and entitled "Multi-CPUs Support With Thread Priority Control," (2) U.S. patent application Ser. No. 10/219,718, filed Aug. 14, 2002 and entitled "System and Method for Controlling and Managing Computer Farms," which are incorporated herein by reference.

BACKGROUND OF THE INVENTION

1. Field of the Invention

This invention relates generally to distributed software execution, and more particularly to a methods and systems for distributing tasks in a multiple server facility.

2. Description of the Related Art

A server farm is a group of networked servers that are housed in one location. A server farm typically streamlines internal processes by distributing the workload between the individual servers and other components of the farm. The server farm can also expedite computing processes by efficiently harnessing the power of the multiple computers (e.g., multiple servers). FIG. 1 shows a block diagram of a typical, prior art server farm 100. The server farm 100 includes multiple servers 102A-n, which are networked together by a network 104. The server farm 100 can also include input/output systems 108 for interfacing and networking the server farm 100 to other computers or computer networks (e.g., Internet, LAN, WAN, etc.). The server farm 100 can also include other devices 110 such as may be necessary for the particular demands of the server farm 100.

The server farm is controlled by a control system 106. The control system 106 is typically a separate controlling computer that includes controlling software 106A. The controlling software 106A is typically specifically designed for the precise needs and design of the server farm 100. The controlling software 106A accomplishes such tasks as load balancing, tracking demand for processing power from the different servers 102A-n, prioritizing the tasks input to the server farm 100 and scheduling and rescheduling the tasks depending on priority and demand that users place on the server farm 100. The control system 106 can also automatically replace a failed server (e.g., server 102A) with another server (e.g., server 102B), when the failed server 102A fails.

Combining servers and processing power into a single server farm 100 has been relatively common for many years in research and academic institutions. However server farms are becoming more and more common as companies are utilizing server farms as a way of handling the enormous amount of computerization of tasks and services that the particular company may require.

The typical prior art server farm control system software 106A includes multiple low-level applications that are specifically designed for the specific hardware and software configuration of each of the individual servers 102A-n and the server farm 100. As server farms become more and more common, the specialization and customization of the control system software 106A becomes more problematic. Each implementation of the typical low level, very specifically designed control system software 106A is very complicated. The complications arise due to the individual, specific hardware and software configuration of the server farm 100. The implementation of the specifically designed control system software 106A is repetitive because many server farms have common requirements. Therefore, customized, low-level control system software 106A is very inefficient and unnecessarily difficult.

In addition, the typical, customized, low-level control system software 106A also uses a very specialized (often customized), low-level script such as a shell script and/or other scripts to define a task. The tasks are therefore limited to low-level functions which therefore resulting in complex, specialized tasks to accomplish complex functions.

There are two problems with the very specialized (often customized), low level scripts. First, all tasks must be submitted in the specialized low-level format which requires add complication for entering tasks. Second the tasks are specialized rather than a standard language format that could be used more easily. This can be especially troubling as the number of server farms increases and the number of different task systems grows.

What is needed is and easier-to-implement server farm control system software that includes a more standardized task system that more both easier to use and more easily supports complex tasks.

SUMMARY OF THE INVENTION

Broadly speaking, the present invention fills these needs by providing a more flexible, more commonly known task system for the server farm control system. It should be appreciated that the present invention can be implemented in numerous ways, including as a process, an apparatus, a system, computer readable media, or a device. Several inventive embodiments of the present invention are described below.

A distributed processing system includes a first computer, and a second computer that is coupled to the first computer by a computer network. The first computer also includes a first Java virtual machine and a Java control system. The second computer includes a second Java virtual machine and a Java control system client. The second computer is configured to execute a task object. The task object includes several sub-tasks including one or more common sub-tasks. The task object also includes a quantity of input data for processing by the task object and a scheduling class that schedules execution of each of the sub-tasks.

The Java controller can include a communication module configured to manage communication between the system controller component and the second computer; and a task management module configured to manage the executing of the task object.

At least one of the sub-tasks can be in communication with an external resource. The external resource can include the task management module.

The input data can include an XML document or other well known formatted data.

The sub-tasks can also include a common sub-task. The common sub-task can include a sub-task that is not executed unless called by the task object in response to a message received by the task object.

The sub-tasks can also include a results processing sub-task that defines the processing of the results on the completed execution of the task object.

The distributed processing system can also include a server farm.

In another embodiment a task object includes several sub-tasks, a quantity of input data for processing by the task object, and a scheduling class that schedules execution of each of the sub-tasks.

The scheduling class can be in communication with an external scheduling resource such as a control system of a distributed processing system.

In one embodiment, the scheduling class includes the sub-task execution scheduling information within the task object.

In one embodiment, at least one of the sub-tasks is in communication with an external resource.

In one embodiment, the common sub-task can include a pause sub-task, a resume sub-task, a stop sub-task and a restart sub-task or other common sub-tasks.

One embodiment includes a server farm that includes a first computer, a second computer coupled to the first computer by a computer network. The first computer can include a first Java virtual machine and a Java control system. The Java control system can include a communication module configured to manage communication between the system controller component and the second computer and a task management module configured to manage the executing of a task object in the second computer. The second computer can include a second Java virtual machine and a Java control system client. The second computer can be configured to execute the task object. The task object can include several sub-tasks, a quantity of input data for processing by the task object, and a scheduling class that schedules execution of each of the sub-tasks. At least one of the sub-tasks is in communication the task management module.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Several exemplary embodiments of self-contained task containers for computer farms will now be described. It will be apparent to those skilled in the art that the present invention may be practiced without some or all of the specific details set forth herein.

While prior art server farm control systems use tasks that have a specialized, low level format (e.g., scripts such as shell scripts and others), an improved server farm control system includes tasks that can process more complex functions and be more easily used by the user. One embodiment, tasks can include more higher-level, more complex formats such as XML (extensible mark-up language) to input data to be processed or to identify resources to be used to process the data. The XML format is just one example of a higher-level format for inputting data and functions that will also provide simpler methods a implementing more complex functionality. In addition, XML is a well-known format that can be more easily provided by users without the user having expertise in the specialized, low-level format.

One Java based system for controlling or managing multiple networked computers, such as in a server farm, is known as Jini™ technology (hereinafter "Jini"). Jini can be used to manage and control a dynamic network of computer systems (servers) that can each have different software/hardware configurations. As used herein, a dynamic network is defined as a network in which the computer resources may be part of the network temporarily and for a specific length of time (i.e., spontaneous). In one example, the Jini can provide spontaneous interaction between network components. In this manner, the computer systems can attach to and detach from the dynamic network of computer resources without disturbing the complete network system.

Figure 1:
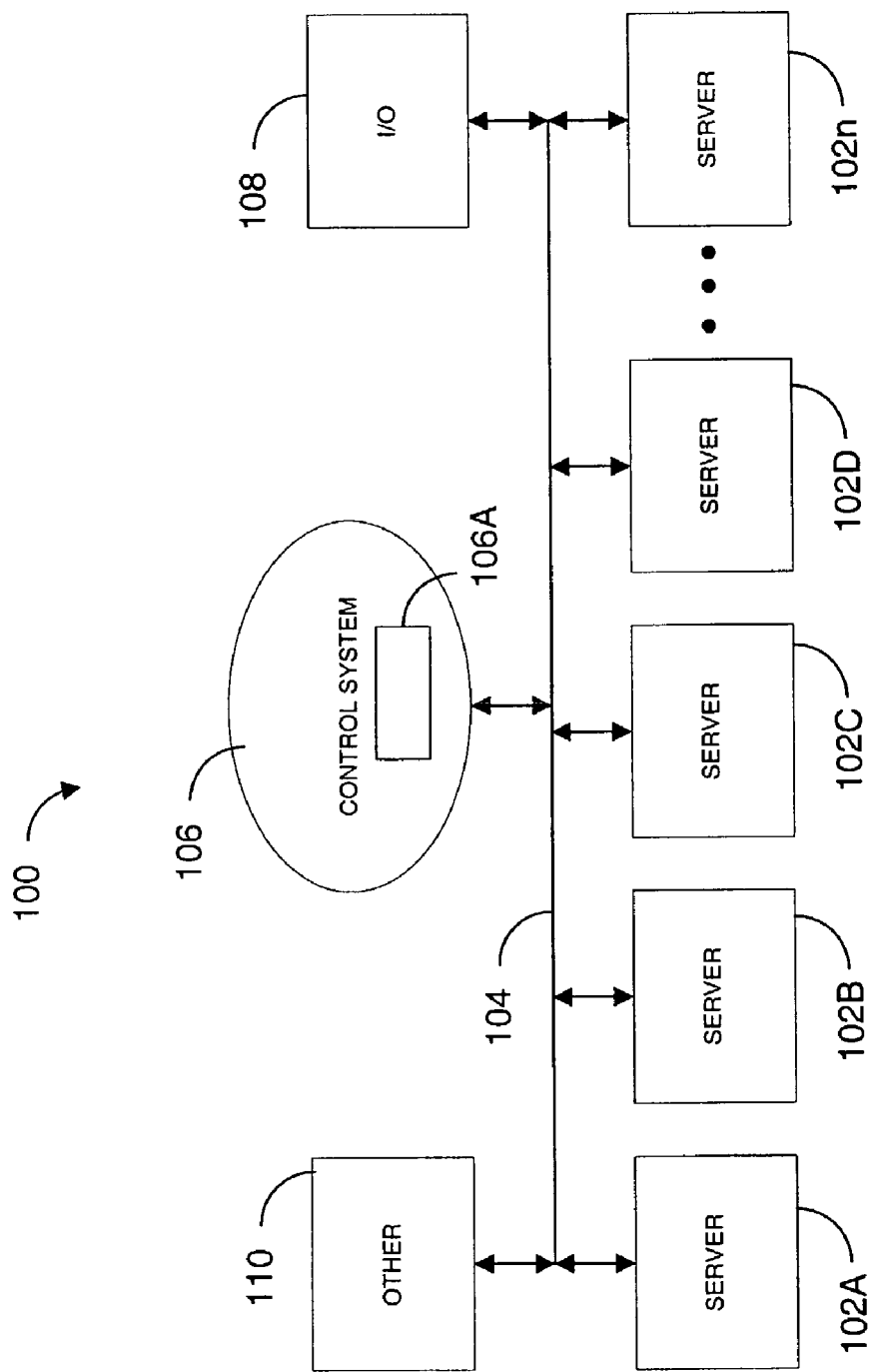
FIG. 1 shows a block diagram of a typical, prior art server farm.
Figure 2:
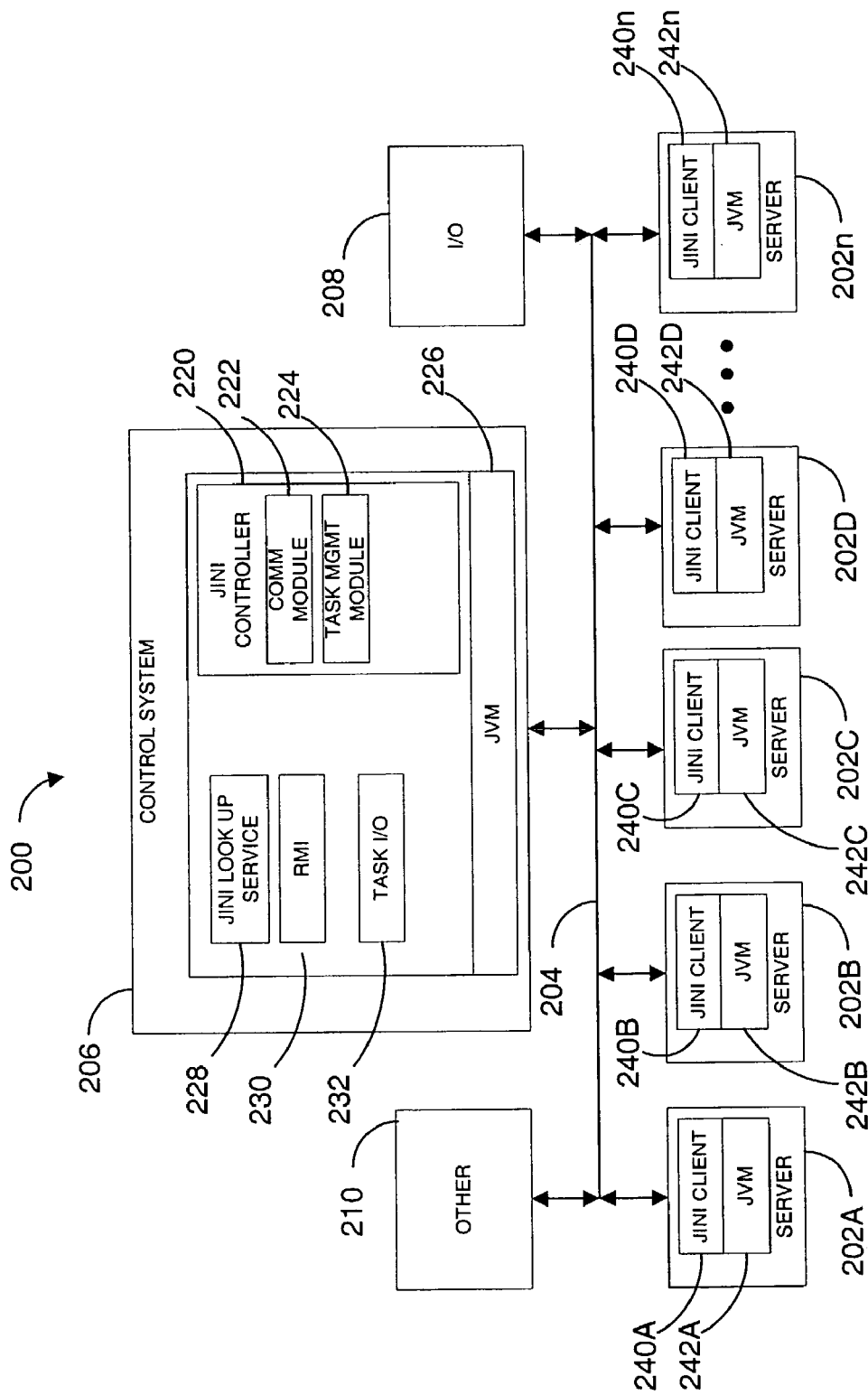
FIG. 2 shows a server farm in accordance with one embodiment of the present invention.

FIG. 2 shows a server farm 200 in accordance with one embodiment of the present invention. The server farm 200 includes a control system 206 that implements the Jini technology to interact with multiple servers 202A-n that are interconnected by a network 204. The control system 206 is configured to include a Jini look up service 228 and a Jini controller 220 configured to manage the processing of the tasks submitted to the server farm 200. The control system 206 can be maintained on one or more computers. In one embodiment each of the multiple servers (i.e. computer resources) 202A-n can "join" the Jini look up service by registering their respective proxies and the corresponding attributes. A communication module 222 is also included and is configured to manage communication between the controller 220 and the other computers 202A-n in the server farm 200. A task management module 228 is configured to manage the execution of one or more software processing tasks within the server farm 200.

In one example, a Jini controller 220 searches the look up service 228 for an available suitable computer resource or resources to process each of the submitted tasks. Each of the multiple servers 202A-n include a corresponding Jini client application 240A-n, respectively. The Jini client applications 240A-n interact with the Jini controller 220 and the Jini look-up service 228.

As one embodiment of the present invention implements the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments such as a server farm 200. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service 228 on a network. As used herein, registering a service is defined as sending the service proxy to all look up services on the network or a selected subset of the look up services. By way of example, the look up service 228 is equivalent to a directory or an index of available services wherein the proxies for each of the services and their associated code are stored. When a service is requested, the proxy associated with the requested service is sent to the requesting client, thus enabling the client to use the requested service. Once dispatched, the proxy can be configured to conduct all communication between the client and the Jini service. As will be described in more detail below, additional methods of communication services can also be included.

In providing an ad-hoc network of computers, in one embodiment, Jini introduces a concept called "leasing." That is, once a service joins the Jini network, the Jini service registers the service's availability for a certain period of leased time. This lease period may be renegotiated (i.e., renewed) before the lease time is expired. When a service leaves the Jini network, the service entry in the look up service 228 is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Unfortunately Jini technology does not provide all solutions required to efficiently control the server farm 200. As will be described in more detail below, Jini has numerous shortfalls but does provide a basic foundation upon which at least some of the solutions conceived by the present invention can be implemented.

One shortfall of using Jini technology is that Jini can be very complex to develop Jini applications. Jini application development is complex because an application developer must master many different methods and classes that are required to fully use all of the complex and remote functionality provided by Jini. By way of example, Jini has many hundreds of classes and objects that can be used to perform Jini operations. These hundreds of classes and objects can be difficult for a developer to completely and successfully master. For example, currently approximately 10 KB of code is required to access Jini functions. One embodiment of the present invention provides a simplified system and method for using Jini.

Figure 3:
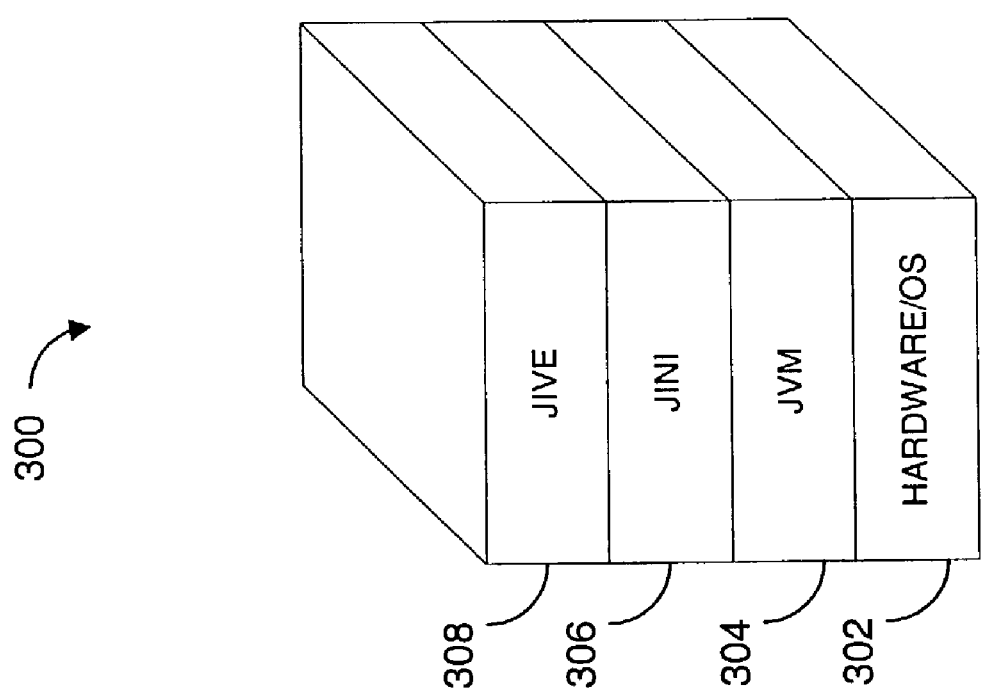
FIG. 3 shows a block diagram of a Jini intercomponent virtual engine (Jive) library layer residing on top of a Jini layer in a Jini development system according to one embodiment of the present invention.

FIG. 3 shows a block diagram of a Jini intercomponent virtual engine (Jive) library layer 308 residing on top of a Jini layer 306 in a Jini development system 300 according to one embodiment of the present invention. The Jive library 308 is shown residing on the Jini layer 306. The Jini layer 306 relies on the Java Virtual Machine (JVM) 304, which as described above, provides the interoperability with the particular hardware 302 layer of the actual computer system.

Unlike Jini, the Jive library 308 has only a few objects and classes that the developer must master to successfully develop a Jini application. The developer can also add additional classes and objects to the Jive library 308 as needed. The developer can also replace classes and objects of the Jive library 308. The Jive library 308 can also be replaced in its entirety, if needed. In comparison to Jini's 10 k of code to implement a Jini method, utilizing the Jive library 308 requires only approximately forty lines of code to enable the same Jini functionality. The Jive library 308 can include calls to Jini objects and classes that are simpler for a developer to use. Jive 308 can also insulate and even isolate the developer from directly accessing Jini classes and objects.

The following is an example of a typical Jini self-registration class:

```
public class pureJini {
    public ServiceClass ( ) {
            cat.debug("Calling dispatcher" + dispatcher);
            dispatcher.addListener(this, Message.ALL_MESSAGES);
        defaultAttributes = new HashMap( );
        msgQueue=new MessageQueue( );
        Thread msgThread = new Thread( ) {
            public void run( ) {
                try {
                    messageLoop( );
                } catch (MessageQueueException mqe) {
                /*
                    RuntimeException re =
                        new RuntimeException("Message might not be delivered");
                    re.fillInStackTrace( );
                    throw re;
                */
                }
            }
        };
        msgThread.start( );
        Runtime.getRuntime( ).addShutdownHook (new Thread( ) {
            public void run( ) {
                cleanUp( );
            }
        });
    }
    public ServiceClass (String lus, String name, HashMap attrs) {
            this( );
        defaultAttributes.put("service.type", getType( ));
        defaultAttributes.put("Service.name", name);
            lookupServer = lus;
            location = new Address(getType( ), name);
            if(attrs != null)
                defaultAttributes.putAll(attrs);
            leaseManager = new SimpleLeaseManager("ServiceClass");
            try {
                register( );
            } catch (RegisterException e) {
            cat.debug(e, e);
                RuntimeException re = new RuntimeException("ServiceClass can't be
registered");
                //re.fillInStackTrace( );
                throw re;
            }
    }
    /**
     * register itself to the JINI lookup server. It will also notify the
     * lease manager so that lease manager can keep it alive on lookup server.
     * @exception RegisterException when there is an error to register itself.
     */
protected void register ( ) throws RegisterException {
        try {
            LookupLocator ll = new LookupLocator(lookupServer);
            ServiceRegistrar sr = ll.getRegistrar( );
            rmt = UnicastRemoteObject.exportObject( this );
            item = new ServiceItem (null, rmt, initAttributes( ));
            ServiceRegistration regis =
                        sr.register(item, SimpleLeaseManager.LEASE_TIME);
            if(item.serviceID == null){
                item.serviceID = regis.getServiceID( );
                cat.debug(item.serviceID);
            }
            SimpleLeaseManager.RegisterInterface ri;
            final ServiceRegistrar fsr = sr;
            ri = new SimpleLeaseManager.RegisterInterface ( ) {
                public Object reregister( ) {
                    try{
                        return fsr.register(item,
                                        SimpleLeaseManager.LEASE_TIME);
                    } catch (Exception e) {
                        return null;
                    }
                }
            };
            leaseManager.renewLeaseFor (sr, regis, ri);
        } catch (Exception e) {
            cat.debug(e, e);
```

-continued

```
                RegisterException re = new RegisterException("Service Component couldn't
register with LookupService");
                //re.fillInStackTrace( );
                throw re;
            }
        }
    }
    public static void main (String [ ] args) {
PropertyConfigurator.configure(System.getProperties( ).getProperty("log4j.configuration"));
        String lus;
        if (args.length==0)
            lus = "jini://myjinihost";
        else lus = args[0];
        if (!lus.startsWith("jini:")) lus = "jini://"+lus;
        System.setSecurityManager(new RMISecurityManager( ));
        ServiceClass sc = new ServiceClass(lus, "test");
    }
}
```

As can be seen from above, the Jini self-registration class is quite lengthy at over 100 lines of code in length. The Jini self-registration class is also complex and provides numerous opportunities for error and requiring extensive program development effort and expertise to create accurately.

For comparison purposes there follows exemplary Jive class for illustrating one embodiment of the present invention. This exemplary Jive class uses several Jive primitives to wrap Jini self-registration calls and provides the same functionality as the above typical Jini self-registration class.

```
public class Agent extends pureJini {
    public static synchronized Agent getInstance (String lus,
                                                  String name,
                                                  HashMap attrs) {
        if (self==null)
            self = new Agent(lus, name, attrs);
        return self;
    }
    // Attributes management has been removed from here.
    HashMap attrs = new HashMap( );
    public static void main (String [ ] args) {
        String lus = new String( );
        HashMap commands = cmdLineParser(args);
        if(args.length >= 1)
            lus = args[0];
        if(!lus.startsWith("jini://"))
            lus = "jini://"+lus;
        System.setSecurityManager(new RMISecurityManager( ));
        try{
            Agent sc = Agent.getInstance(lus, "at" +
java.net.InetAddress.getLocalHost( ).getHostName( ),
                                         attrs);
        } catch(Exception e) {
            cat.error(e);
            cat.debug(e, e);
            System.exit(1);
        }
    }
}
```

In comparison, the Jive class has only 35 lines of code versus over 100 lines of code for the Jini class providing the same functionality.

Figure 4:
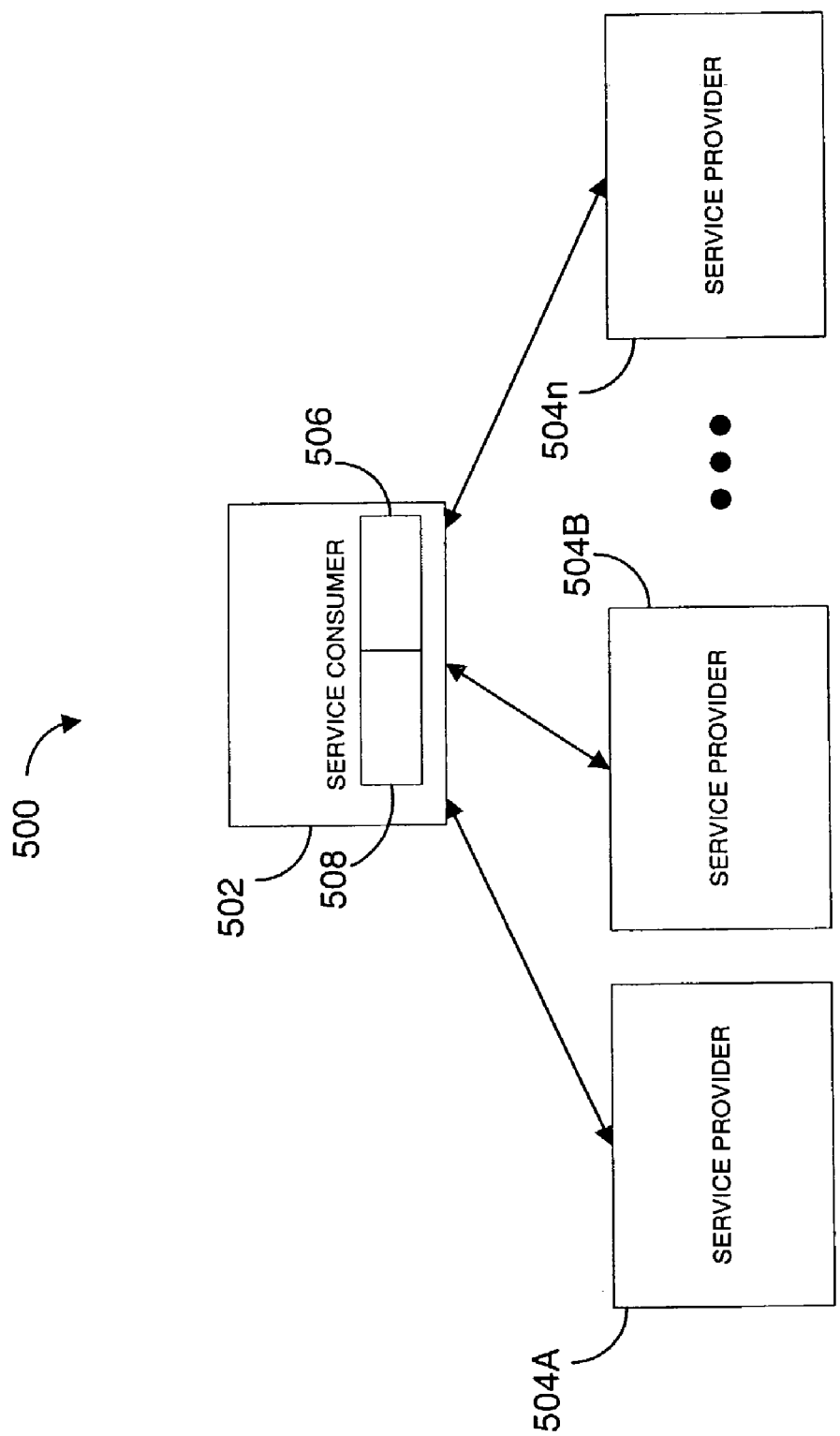
FIG. 4 shows a block diagram of a network of multiple computing resources.

FIG. 4 shows a block diagram of a network 500 of multiple computing resources 502, 504A-*n*. A first computing resource is a service consumer 502 in that it requires one or more service providers (such as service providers 504A-*n*) to perform a service. By way of example, the service consumer 502 can be a control system such as control system 206 in FIG. 2 above, that is dispatching tasks to be performed by various computing resources such as servers 202A-*n* (e.g., service providers 504A-*n*). Alternatively, the service consumer 502 can be any computer that is using any of the other computing resources 202A-*n*, 210, 208, 206 of the server farm 200, as service providers 504A-*n*, to perform tasks for the service consumer 502.

Figure 5:
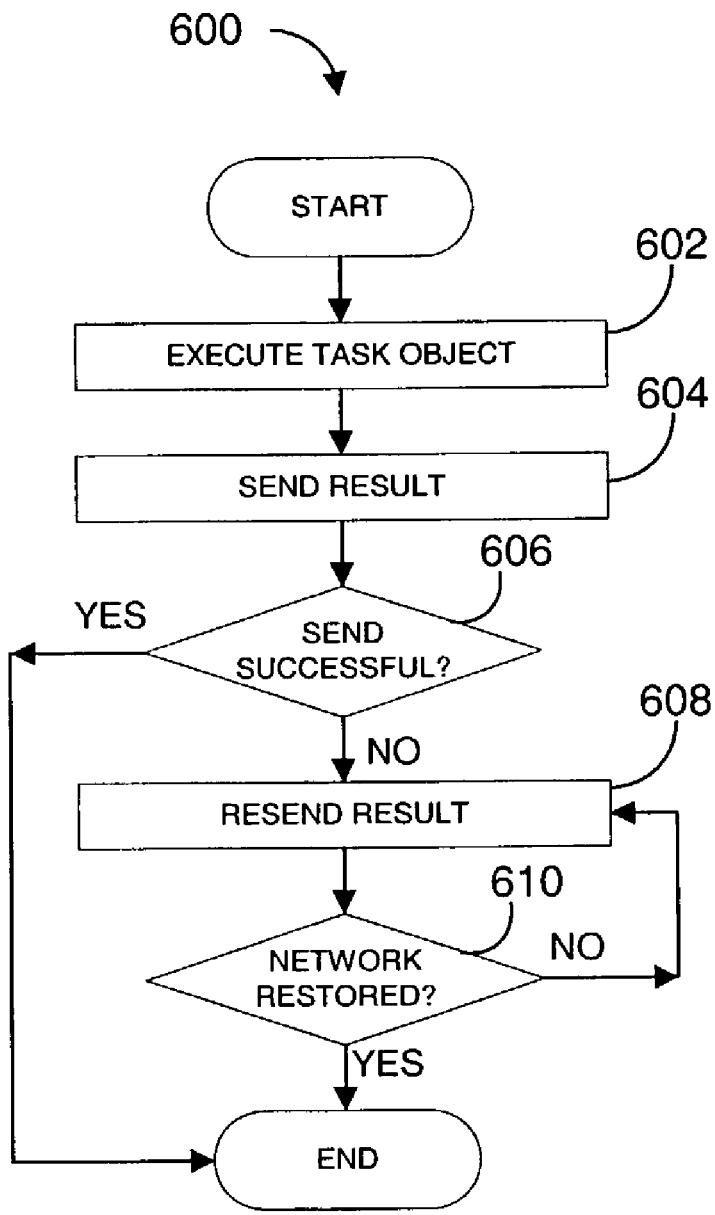
FIG. 5 shows the method operations of a service provider outputting an executed task object result according to one embodiment of the present invention.

As described above, the network outage messages (e.g., exceptions thrown) can also notify a leased service that other messages sent across the network were not successfully delivered due to network interruptions. FIG. 5 shows the method operations 600 of a service provider outputting an executed task object result according to one embodiment of the present invention. In operation 602, a service provider 504A has completed execution of a task object and a result is produced. The task object also includes outputting the result. In operation 604, the result is output. If the service provider 504A sends the completed result in operation 604 and receives a network outage message or other message indicating the result did not successfully get through the network in operation 606, then the service provider 504A can retain the result. The retained result can then be sent repetitively in operations 608 and 610, until the network outage message(s), are no longer received or another response as described herein is received by the service provider 504A, from the service consumer 502. Once the result is successfully sent in operation 610, the method operations end.

As described in FIG. 5, the task result is not lost due to the network outage and the service provider 504A can complete the task object regardless of the network connection status. Thereby, the result is preserved and the task object is not required to be repeated.

Yet another shortfall of Jini is that the conventional Jini message system is not sufficiently reliable enough to efficiently manage and control a server farm 200. One embodiment of the present invention provides an improved, more reliable message system. A local message queue or system can be included within each service class. Referring again to FIG. 4, if a service provider 504B send s a message, the message is sent to a local message queue 506. Similarly, when a message for one of the service providers 504A-*n* is received in the local message queue 506, a local message dispatcher 508 delivers the message to the service provider (or providers) that may be interested in receiving the message or type of message.

In one instance, a service provider 504B within a selected service class 500 is a message counter. Therefore all messages sent to any service providers 504A-*n* within the service class 500 would be sent to the message counter in service provider 504B in addition to the particular service provider (e.g., service provider 504A) or providers that the message is specifically directed to.

The local message queue 506 allows messages between service provider(s) and/or the service consumer(s) within the service class 500 to be routed locally. In addition, the local message queue 506 allows a message from within the service class 500, that is directed to a recipient that is outside of the service class 500 (e.g., an output result from a service provider) to be delivered as described in FIG. 5 above.

Still another shortfall of Jini is that the task exchange mechanism is typically formatted according to the specific requirements of the application and can even be service provider specific. One embodiment of the present invention provides a universal task exchange system. The universal task exchange system includes multiple universal task messages including: a reserve service provider message, an envelope message, a run task message, a pause task message, a resume task message, a restart task message, a stop task message, a task completed message, and an unreserve message.

A reserve service provider message is a message sent by a service consumer 502 to a service provider (e.g., service provider 504A) to reserve or lock-up service provider 504A so that other service consumers cannot also use the service provider 504A and thereby interfere with the execution of the task object(s) the service consumer 502 will send to the service provider 504A. The reserve message can be synchronous or asynchronous. A synchronous reserve message provides a confirmation that the service provider 504A is reserved for the use of the service consumer 502 such as executing task objects for the service consumer 502.

An envelope message is a message the service consumer 502 can use to enclose the current task object for transfer to the service provider 504A. The run task message instructs the computing resource (i.e., a service provider 504A) to execute the current task object. The stop message instructs the computing resource to cease and abort execution of the current task object. The pause task message instructs the computing resource to pause execution of the current task object at the then current stage of execution but does not abort execution of the current task object. The resume task message instructs the computing resource to unpause execution of the current task object (i.e., continue execution of the current task object at the stage of execution where paused by a previous pause task message).

The restart task message instructs the computing resource to stop execution of the current task object and begin the execution at the beginning of the current task object. The service provider 504A can send a task completed message when the execution of the current task object is completed. An unreserve message can be sent by the service consumer 502 to the service provider 504A, in response to the task completed message. The unreserve message can be synchronous or asynchronous.

Figure 6:
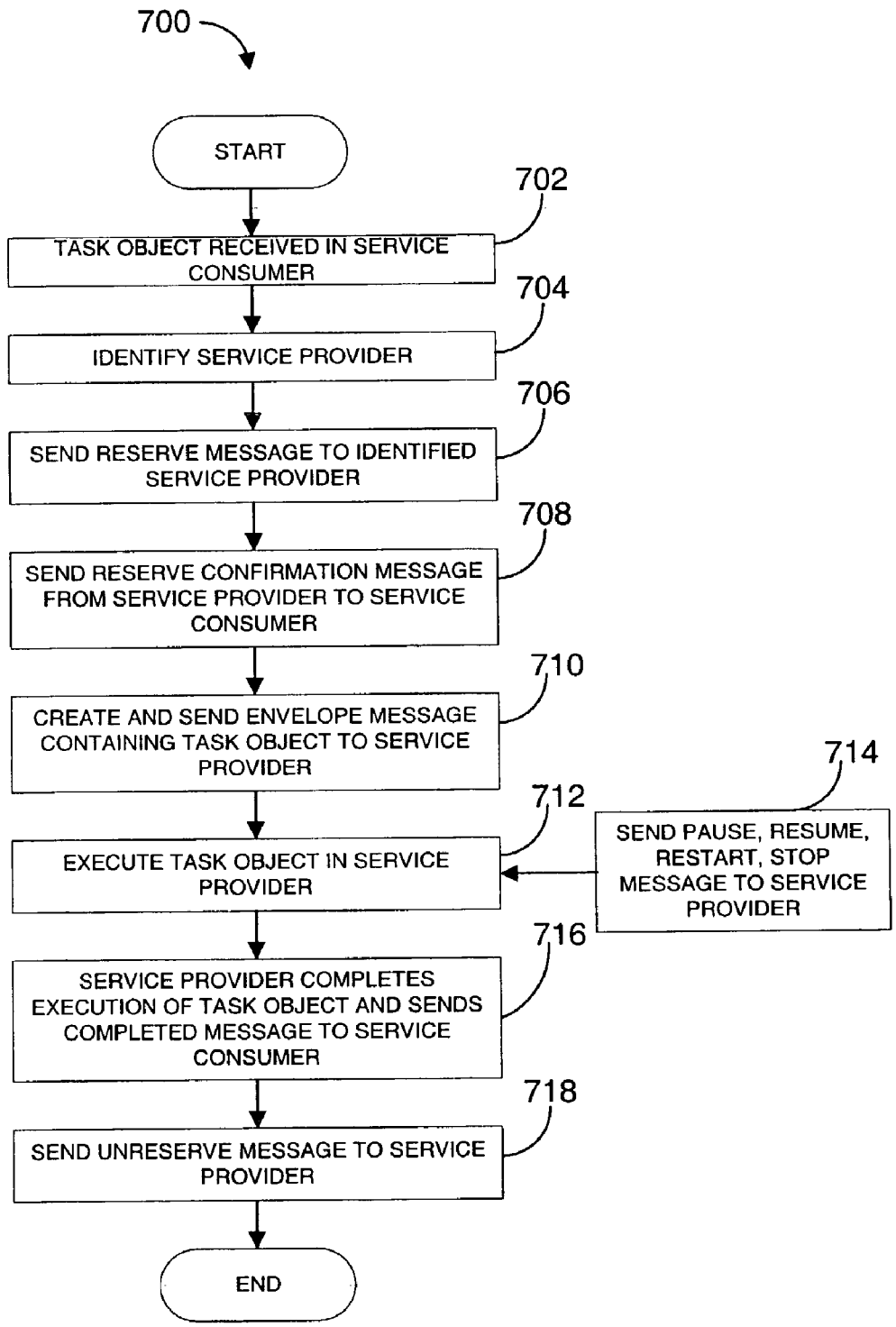
FIG. 6 illustrates exemplary method operations of the exchange of several universal messages between a service consumer and a service provider according to one embodiment of the present invention.

FIG. 6 illustrates exemplary method operations 700 of the exchange of several universal messages between a service consumer 502 and a service provider 504A according to one embodiment of the present invention. In operation 702, a task object is submitted to the service consumer 502 from some other source. The task object can be submitted to the service consumer 502 by a source within the service class 500 or outside the service class 500.

In operation 704, the service consumer 502 identifies an appropriate service provider (i.e., service provider 504A) using the Jini look-up service 228. Once the appropriate service provider 504A is identified, the service consumer 502 sends a reserve message to the service provider 504A in operation 706.

The service provider 504A can respond to the synchronous reserve message to confirm availability of the service provider 502, in operation 708. Alternatively, if the reserve message is not a synchronous reserve message, then operation 708 can be bypassed.

In operation 710, the service consumer 502 creates and sends an envelope message that includes the task object within the body of the message. In operation 712, the service provider 504A receives the envelope message and extracts the task object.

In operation 712, the service provider 504A initiates the task object and executes the task object. In operation 714, during execution of the task object, the service consumer 502 can pause, resume, restart and stop the execution of the task object using the corresponding messages described above.

In operation 716, the service provider 504A completes execution of the task object and sends a task completed message to the service consumer 502 when execution of the task object is completed. The service consumer 502 can also send an unreserve message the service provider 504A, in operation 718. The unreserve message can release the service provider 504A for another service consumer's use. The unreserve message can be synchronous or asynchronous.

Jive also provides several benefits regarding producing task objects as a Jive task object can be produced in Java rather than in a low-level script as required by prior art tasking systems. Further, because the Jive task object is a Java object, then producing the Jive task object does not require specialized knowledge of the prior art low-level scripting.

Figure 7:
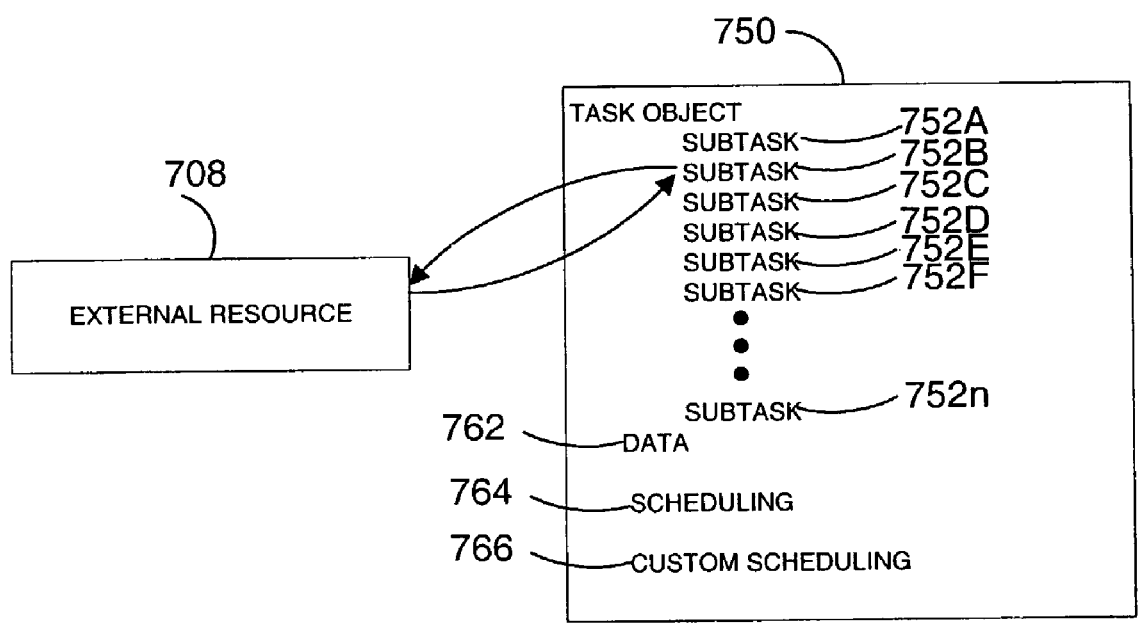
FIG. 7 illustrates a Jive self-contained task object according to one embodiment of the present invention.

FIG. 7 illustrates a Jive self-contained task object 750 according to one embodiment of the present invention. The self-contained task object 750 can include a virtually unlimited number of sub-tasks 752A-n. Jive allows task objects to be more self-contained (i.e. include greater numbers of sub-task objects) and therefore each task object can perform a greater number of functions. Because fewer task objects are required to perform a given set of desired functions, those fewer task objects reduce the "overhead" requirements of management and control of a distributed processing system such as a server farm and therefore increase the efficiency of the management and control of the server farm.

In one embodiment, Jive allows a task object 750 to include additional capabilities than those described above. The task object 750 can input data 762 for processing. In one embodiment the input data 762 is in the form of an XML document or other well-known format document rather than in a proprietary relatively unknown format require by the prior art scripting methods described above.

The task object can also define the behavior of the task object 750 (i.e., only the task object knows the precise functions of the task object). By way of example:

```
Run ( ) {
    <run test harness; perform calculation; or other desired function>
}
```

Another additional function of a task object 750 is the capability to directly use external resources (e.g., libraries, Java application server, or other resources). An external resource is a resource that not included within the task object 750 itself. The external resources can be local or remote or shared or other types of resources. By way of example, when a service provider executes the task object 750, the service provider may not know what exact resources are required by the task object 750 to complete the execution however the task object 750 can access (e.g., send messages to and/or receive messages from) the external resources by way of a sub-task 752B that can send and receive messages to and from a given external resource 770.

Multiple task objects can be processed within a server farm or other distributed processing system. Therefore, each of the task objects must be scheduled. Because each task object is more complex then fewer task objects are required. The fewer task objects can simplify the scheduling requirements of the over all processing system (i.e., simplifies the demands on the control system 206 of FIG. 2 above). In one embodiment a task object can also include or define its own scheduling by including a scheduling class 764 such as:

Current task
Next task
. . .
last task

The following is another example of a scheduling class 764:

```
Task: getnextsubtask( )
<behaviors>
    class = "custom class"
    url = "location of class"
</behaviors>
```

The "custom class" allows the control of the task scheduling to be external to the task object 750 (i.e., the external resource 770 can be an external scheduling resource and the task object can access the external scheduling resource to determine scheduling). The "location of class" can be a url that identifies the location of the external task scheduling resource. In one embodiment, the external task scheduling resource can be the task management module 224 of the control system 206 of FIG. 2 above. The task management module 224 can control the scheduling of the execution of each task object and even sub task objects within the task object. The custom class can access the task management module 224 to determine the task object scheduling. Each task object can also include a custom scheduler 766 that schedules the execution of each sub-task 752A-n within the task object 750. The custom scheduler 766 allows multiple concurrent sub-task object scheduling and execution independent of the task management module 224.

In one embodiment, the task object 750 can include multiple common sub-tasks 752C–E. The common sub-tasks 752C–E can be called in response to a message received by the task object. In one example, sub-task 752C is a common pausetask sub-task and sub-task 752D is a common resumetask sub-task. If task object 750 receives a message (such as from the task management module 224) instructing task object 750 to pause execution, then task object 750 can call pausetask sub-task 752C to pause the execution. When task object 750 receives a message instructing task object 750 to resume execution, then task object 750 can call resumetask sub-task 752D to resume the execution.

In another embodiment, the task object 750 can also include a results processing sub-task 752F. The results processing sub-task 752F can give the task object 750 the "knowledge" of what to do with results of the completed task object 750 e.g., what to do with the result data that was produced by the task object 750. For example the results processing sub-task 752F can include the function of storing the results in a database, or outputting the results, or other functions.

Although the present invention mainly describes exemplary embodiments of a server farm control system, it must be understood by one having ordinary skill in the art that the described embodiments of the present invention can be implemented to run any distributed processing functions or applications. Additionally, although the present invention is described based on the Jini technology, other network technologies having the capability to create an ad-hoc group of computer resources may be implemented (e.g., RMI, TCP/IP Sockets, etc.). Furthermore, although the present invention implements Java programming language, other programming languages may be used to implement the embodiments of the present invention (e.g., C, $C_{++}$, any object oriented programming language, etc.).

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter, be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 5 and 6 are not required to be performed in the order illustrated, and that all the processing represented by the operations may not be necessary to practice the invention. Further, the processes described in FIGS. 5 and 6 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A distributed processing system comprising:
a first computer including:
a first Java virtual machine; and
a Jini controller including a Jini intercomponent virtual engine (Jive) library;
a second computer including:
a second Java virtual machine; and
a Jini client; and
a dynamic computer network that temporarily couples the first computer and the second computer for an indefinite length of time, wherein the Jini controller includes logic for controlling the dynamic computer network and wherein the Jini controller includes logic for assembly and interaction of services and devices coupled to the dynamic network including logic for searching a look up service for a suitable computer resource that is available to execute a task object, and logic for configuring the second computer to execute the task object, the task object including:
a plurality of sub-tasks including one or more common sub-tasks;
a quantity of input data for processing by the task object; and
a scheduling class that schedules execution of each of the plurality of sub-tasks, wherein the lookup service includes a directory of available services.

2. A distributed processing system of claim 1, wherein the Jini controller includes:
a communication module including logic to manage communication between the Jini controller component and the second computer; and
a task management module including logic to manage the executing of the task object.

3. A distributed processing system of claim 2, wherein the at least one of the plurality of sub-tasks is in communication with an external resource.

4. The distributed processing system of claim 3, wherein the external resource includes the task management module.

5. The distributed processing system of claim 2, wherein the Jini client includes:
logic for determining a network outage;
logic for detecting completion of the execution of the task object; and
logic for sending a result of the completed execution of the task object when the network outage has terminated.

6. The distributed processing system of claim 2, wherein the Jini client includes:
a client local message que; and
logic for delivering a client local message in the client local message que to the Jini controller when the Jini client is in communication with the Jini controller.

7. The distributed processing system of claim 6, wherein the logic for delivering the client local message in the client local message que to the Jini controller when the Jini client is in communication with the Jini controller includes logic for iteratively sending the client local message to the Jini controller until the Jini client is in communication with the Jini controller.

8. The distributed processing system of claim 6, wherein the client local message includes an execution result from a completion of the task object.

9. The distributed processing system of claim 1, wherein the input data includes an XML document.

10. The distributed processing system of claim 1, wherein the common sub-task includes a sub-task that is not executed unless called by the task object in response to a message received by the task object.

11. The distributed processing system of claim 1, wherein at least one of the plurality of sub-tasks includes a results processing sub-task that defines the processing of the results on the completed execution of the task object.

12. The distributed processing system of claim 1, wherein the distributed processing system includes a server farm.

13. The distributed processing system of claim 1, wherein the Jini controller includes:
a controller local message que; and
logic for delivering a controller local message in the controller local message que to the Jini client when the Jini controller is in communication with the Jini client.

14. The distributed processing system of claim 13, wherein the controller local message includes the task object.

15. The distributed processing system of claim 1, wherein the common sub-task includes at least one of a group consisting of a pause sub-task, a resume sub-task, a stop sub-task and a restart sub-task.

16. A server farm comprising:
a first computer including:
a first Java virtual machine; and
a Jini controller including:
a communication module configured to manage communication between the Jini controller component and a second computer;
a task management module configured to manage an execution of a task object; and
a Jini intercomponent virtual engine (Jive) library;
the second computer including:
a second Java virtual machine; and
a Jini client; and
a dynamic computer network that temporarily couples the first computer and the second computer for an indefinite length of time, wherein the Jini controller includes logic for assembly and interaction of services and devices coupled to the dynamic network including logic for controlling the dynamic computer network, and wherein the Jini controller includes logic for searching the look up service for a suitable computer resource that is available to execute a task object, and logic for configuring the second computer to execute the task object, the task object including:
a plurality of sub-tasks;
a quantity of input data for processing by the task object; and
a scheduling class that schedules execution of each of the plurality of sub-tasks;
wherein at least one of the plurality of sub-tasks is in communication with the task management module and wherein the lookup service includes a directory of available services.

* * * * *